(12) United States Patent
Tsai

(10) Patent No.: US 8,449,110 B2
(45) Date of Patent: May 28, 2013

(54) VIEWING GLASS WITH ADJUSTMENT MECHANISM

(75) Inventor: Tung-Chi Tsai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 152 days.

(21) Appl. No.: 13/029,086

(22) Filed: Feb. 16, 2011

(65) Prior Publication Data

US 2012/0092610 A1  Apr. 19, 2012

(30) Foreign Application Priority Data

Oct. 14, 2010 (TW) .............................. 99135141 A

(51) Int. Cl.
  *G02C 5/14* (2006.01)
  *G02C 5/22* (2006.01)
  *G02C 5/00* (2006.01)
(52) U.S. Cl.
  CPC . *G02C 5/22* (2013.01); *G02C 5/006* (2013.01)
  USPC ............................................. 351/121; 351/41
(58) Field of Classification Search
  CPC ................................... G02C 5/22; G02C 5/006
  USPC ............................. 351/111–121, 153; 16/228
  See application file for complete search history.

(56) References Cited

U.S. PATENT DOCUMENTS

2011/0069275 A1 * 3/2011 Ohno et al. .................... 351/113

* cited by examiner

*Primary Examiner* — Huy K Mai
(74) *Attorney, Agent, or Firm* — Altis Law Group, Inc.

(57) ABSTRACT

A viewing glass includes a frame containing two glasses and two axial ends, two temples each having a joint seat, and two adjustment mechanisms connecting with the frame and the two temples. The joint seat includes a groove for receiving the adjustment mechanism, the adjustment mechanism includes a location post, the axial end of the frame defines a ladder shape recess corresponding to the location post for adjusting a distance between the two temples. The adjustment mechanism comprises a button and a location post extending from the button, the location post includes an opening groove to divide the location post into two parts, each part includes a hook which is away from the button. The inner surface of the joint seat along the groove includes a sliding groove to receive the button of the adjustment mechanism sliding in the sliding groove, the bottom of the sliding groove includes a location recess, the bottom of the button includes a protrusion engaged with the location recess for fixing the location post.

6 Claims, 5 Drawing Sheets

VIEWING GLASS WITH ADJUSTMENT MECHANISM

BACKGROUND

1. Technical Field

The present disclosure generally relates to a viewing glass, and particularly to a viewing glass with adjustment mechanism.

2. Description of the Related Art 3D movies are gaining popularity, in which a viewing glass are required for proper viewing. The viewing glass can often be reused, and are commonly produced in a single size, presenting individual fit issues. Specifically, the temple width of the viewing glass is fixed, and may not fit or fit loosely on movie patrons having larger or smaller size heads that the viewing glass are designed for.

What is needed, therefore, is a viewing glass which can be easily adjusted, to ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the viewing glass with adjustment mechanism. Moreover, in the drawings, like reference numerals designate corresponding parts throughout the views.

DETAILED DESCRIPTION

Embodiments of a viewing glass with adjusting mechanism as disclosed are described in detail here with reference to the drawings.

Figure 1:
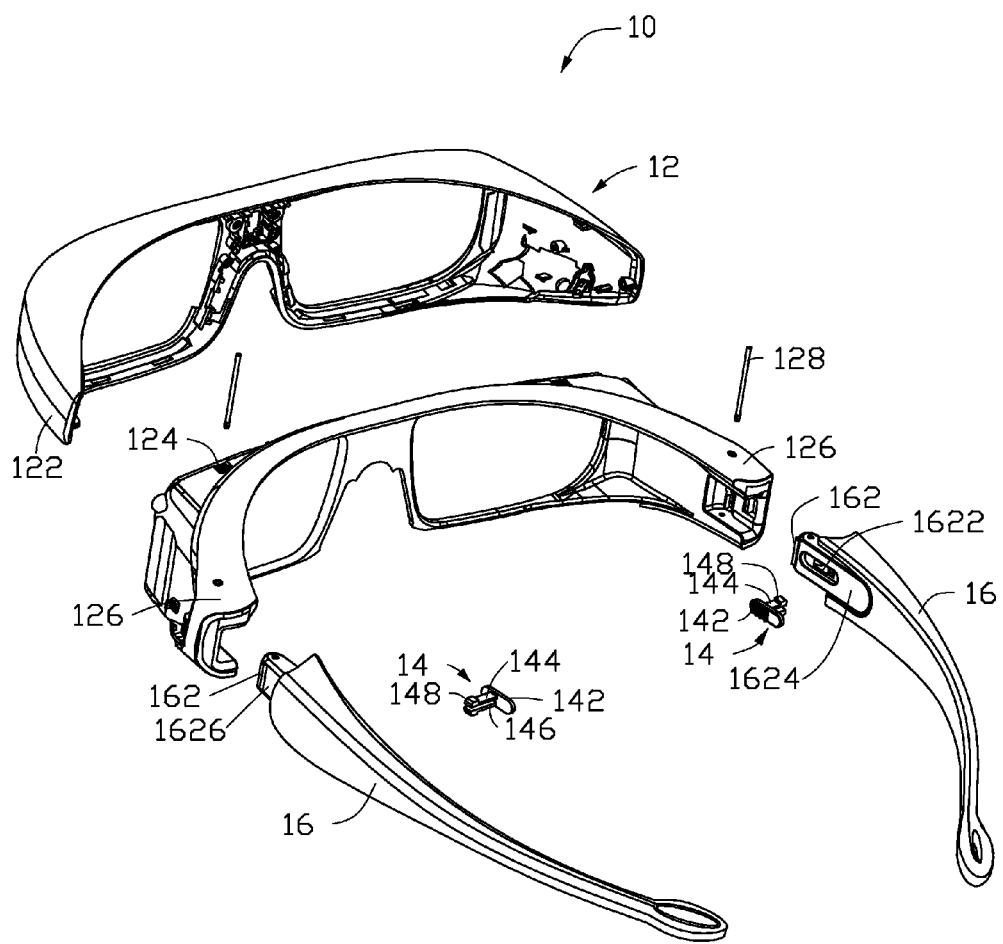
FIG. 1 is a schematic exploded view of a viewing glass with adjustment mechanism in accordance with a first embodiment.

Referring to FIG. 1, a viewing glass 10 in accordance with a first embodiment include a frame 12, two adjustment mechanisms 14, and two temples 16. The frame 12 includes a front cover 122 and a rear cover 124 to receive viewing glasses (not shown). The two sides of the rear cover 124 include two axial ends 126 connecting with the two temples 16 hinging on two fixing axes 128.

Figure 3:
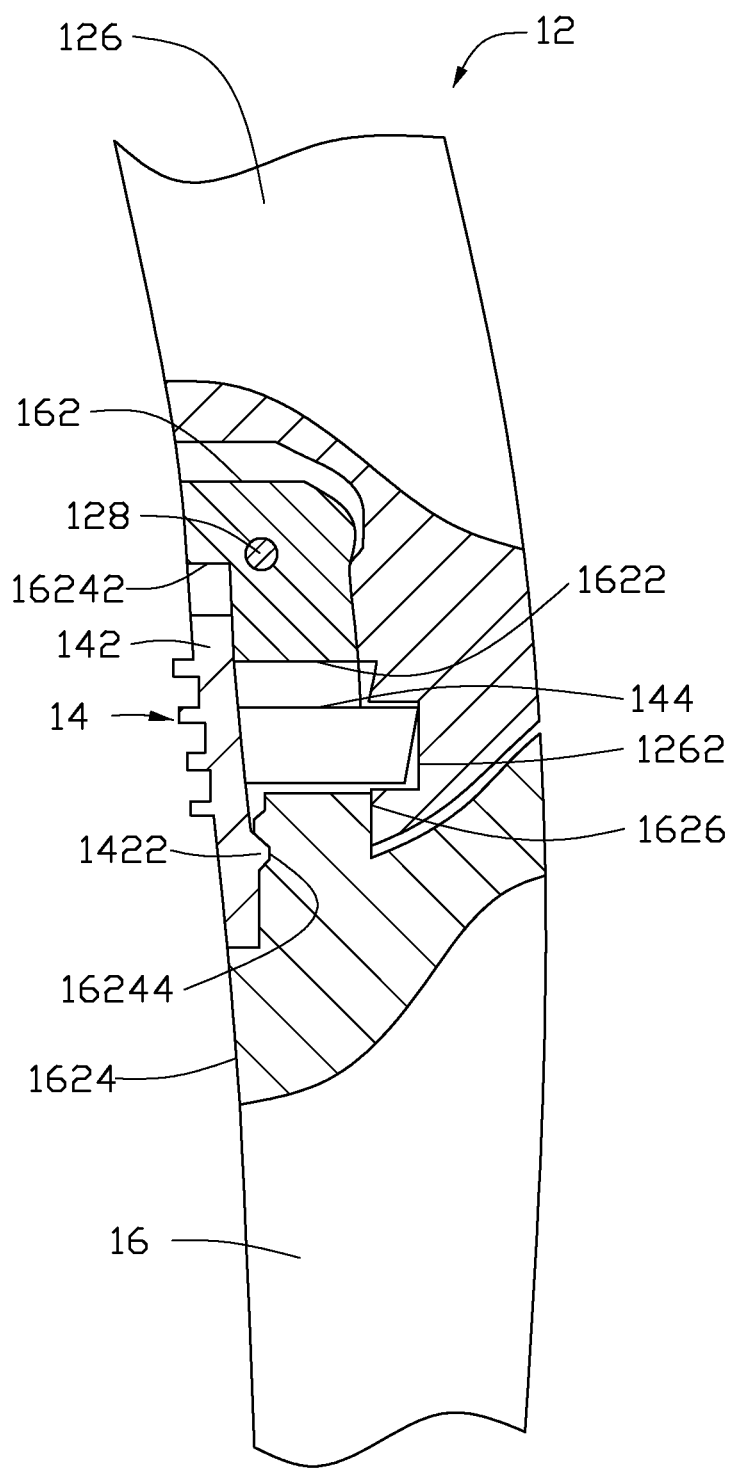
FIG. 3 is a schematic cross section of a frame and an axial end of a temple of the viewing glass of FIG. 2.

The temple 16 is elastic and includes a joint seat 162 corresponding to the axial end 126. The joint seat 162 includes a groove 1622 to receive the adjustment mechanism 14. The groove 1622 passes through the joint seat 162 extending from the inner surface 1624 to the outer surface 1626. The adjustment mechanism 14 is approximately T shaped and includes a button 142 and a location post 144 extending out from the button 142. The location post 144 includes an opening groove 146 to divide the location post 144 into two opposing parts containing a hook 148 away from the button 142. The opening groove 146 allows the location post 144 to be flexible. The opening groove 146 and the flexibility of the location post 144 allows the hook 148 to move inwardly and the location post 144 to pass through the groove 1622 from the inner surface 1624 of the joint seat 162 to make the hook 148 protruding out the outer surface 1626 of the joint seat 162. The hook 148 fixes the location post 144 in the groove 1622. The axial end 126 of the frame 12 includes a ladder shape recess 1262 (see FIG. 3) corresponding to the adjustment mechanism 14. The location post 144 cooperates with the ladder shape recess 1262 to adjust a distance between the two temples 16 (as shown in FIG. 3).

Figure 2:
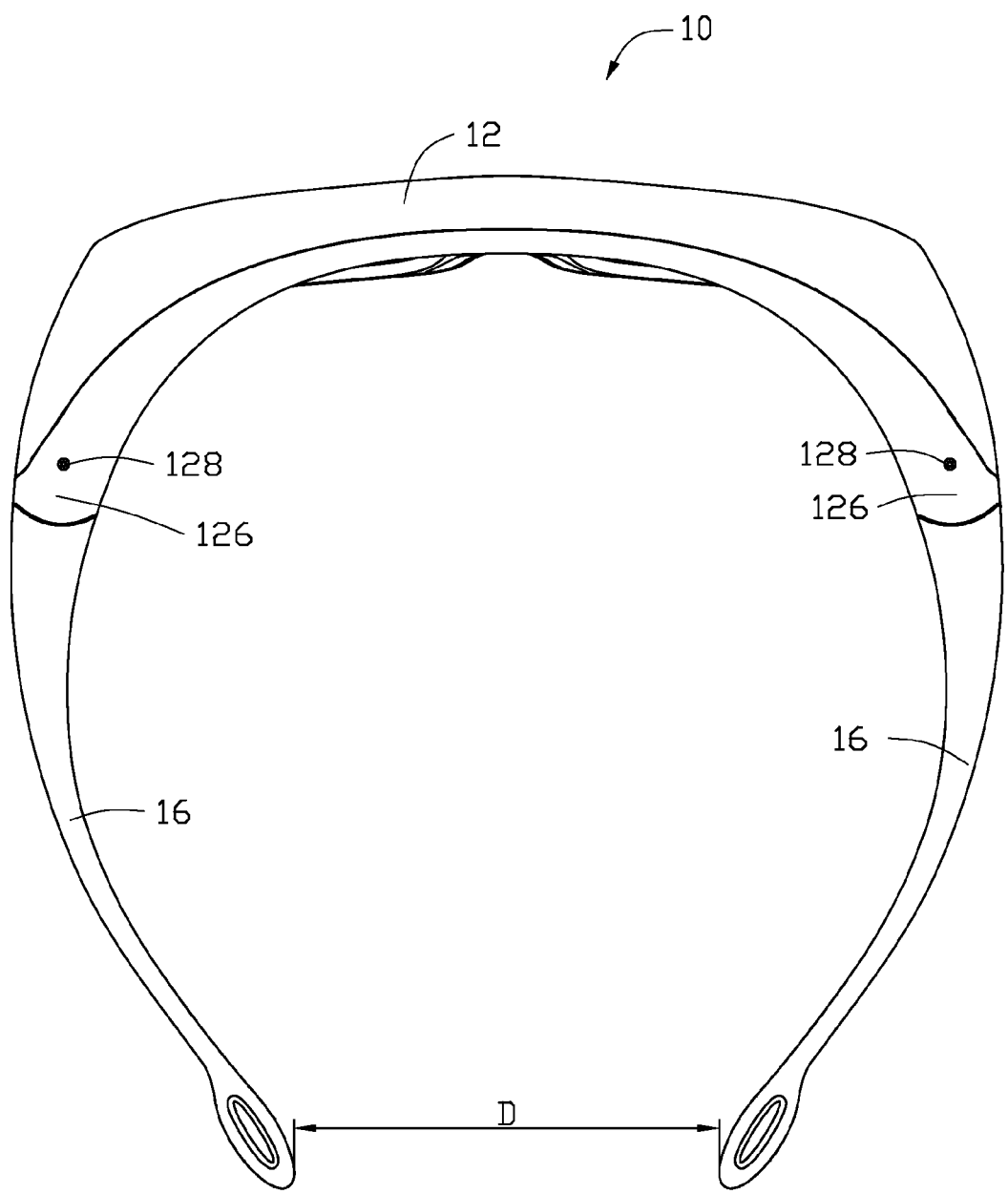
FIG. 2 is a schematic assembly view of the viewing glass of FIG. 1.

Referring to FIG. 2, the two temples 16 connect the axial end 126 of the frame 12 with a larger distance D between the two temples 16. Referring to FIG. 3, when the location post 144 is received in the ladder shape recess 1262 nearest to the temples 16, the two temples 16 have a larger distance D. In this embodiment, the ladder shape recess 1262 includes two stages. The ladder shape recess 1262 can include a plurality of stages of differing intervals.

The inner surface 1624 of the joint seat 162 includes a sliding groove 16242 along the groove 1622 to receive the button 142 of the adjustment mechanism 14 and along which the button 142 slides. A location element is defined in the viewing glass for locating the sliding position of the button 142 in the sliding groove 16242. The location element includes a protrusion 1422 defined at the bottom of the button 142 and a location recess 16244 defined at the bottom of the sliding groove 16242 corresponding to the protrusion 1422. The protrusion 1422 is received in the location recess 16244 to locate the position of the button 142. The number and interval of the location recesses 16244 correspond to those of the ladder shape recess 1262.

To adjust the viewing glass, the two temples 16 are hinged inwardly toward the frame 12. The location post 144 of the adjustment mechanism 14 exits the ladder shape recess 1262. Pressure on the button 142 of the adjustment mechanism 14 separates the protrusion 1422 and location recess 16244 to adjust the distance between the two temples 16.

Figure 4:
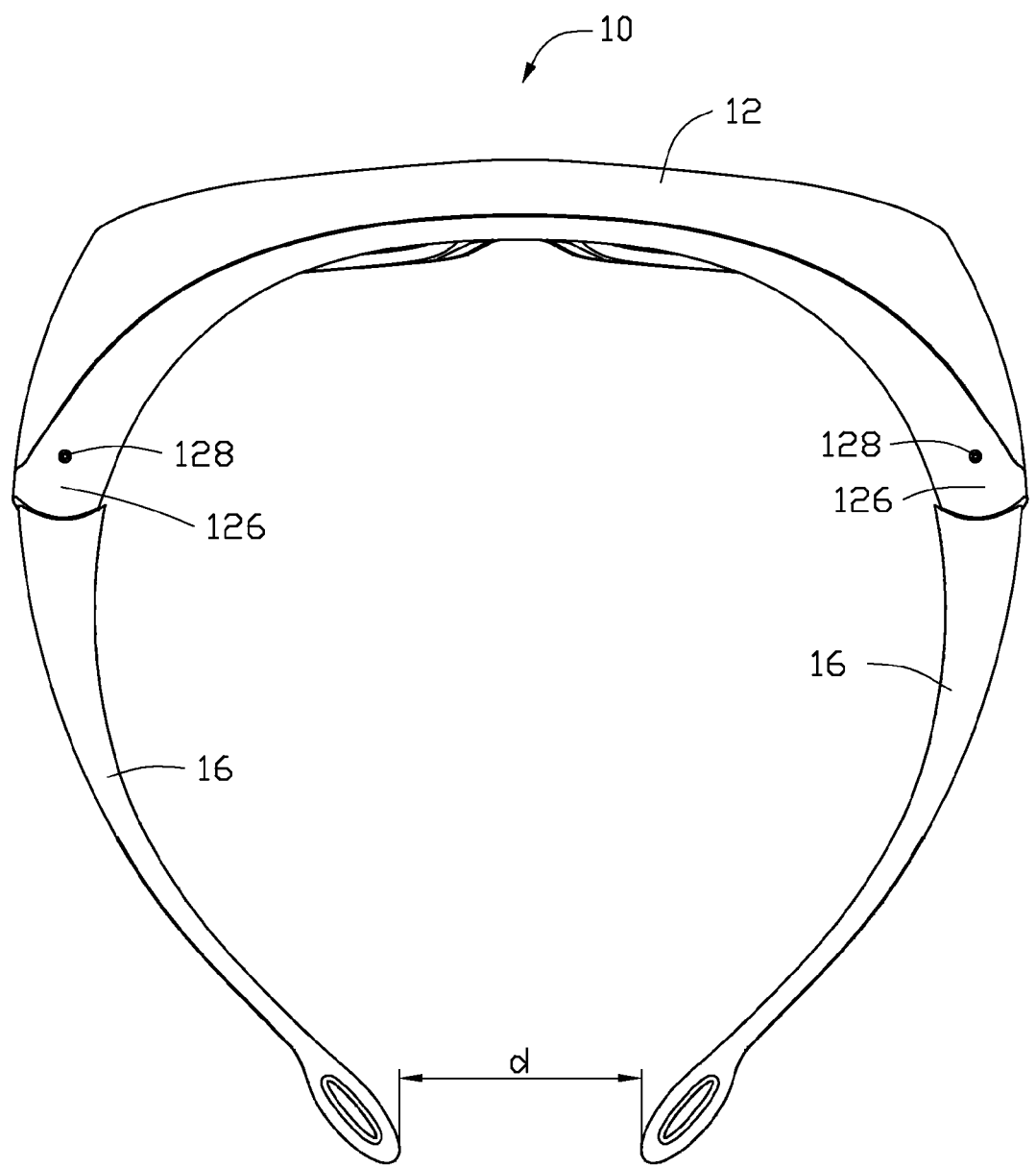
FIG. 4 is a schematic assembly view of the viewing glass of FIG. 1 with narrower distance between the two temples.
Figure 5:
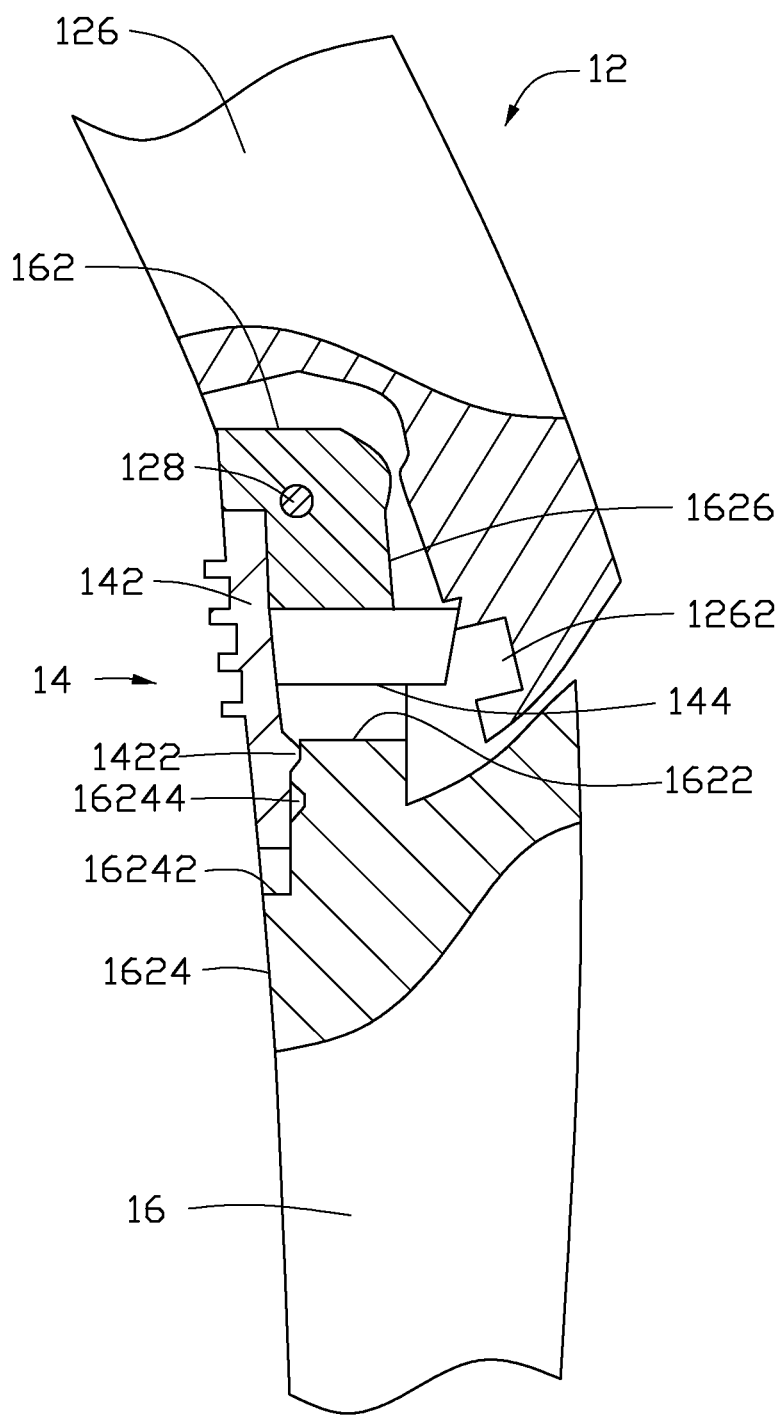
FIG. 5 is a schematic cross section of a frame and an axial end of a temple of the viewing glass of FIG. 4.

Referring to FIG. 4, the two temples 16 connect to the axial end 126 of the frame 12 with a smaller distance d between the two temples 16. Referring to FIG. 5, the location post 144 is received in a recess of the ladder shape recess 1262 nearest to the axial end 126 of the frame 12, and the two temples 16 have a smaller distance d.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A viewing glass comprising:
   a frame containing two glasses and two axial ends;
   two temples each having a joint seat; and
   two adjustment mechanisms connecting with the frame and the two temples, wherein the joint seat includes a groove for receiving the adjustment mechanism, the adjustment mechanism includes a location post, the axial end of the frame defines a ladder shape recess corresponding to the location post for adjusting a distance between the two temples;
   wherein the adjustment mechanism comprises a button and a location post extending from the button, the location post includes an opening groove to divide the location post into two parts, each part includes a hook which is away from the button;

the inner surface of the joint seat along the groove includes a sliding groove to receive the button of the adjustment mechanism sliding in the sliding groove, the bottom of the sliding groove includes a location recess, the bottom of the button includes a protrusion engaged with the location recess for fixing the location post.

2. The viewing glass of claim 1, wherein the ladder shape recess includes a plurality of stages and the intervals of the stages are different.

3. The viewing glass of claim 1, wherein the groove passes through the joint seat from an inner surface to an outer surface.

4. The viewing glass of claim 1, wherein the location post passes through the groove from the inner surface of the joint seat to make the hook protruding from the outer surface of the joint seat.

5. The viewing glass of claim 1, wherein the number and interval of the location recess correspond to the ladder shape recess.

6. The viewing glass of claim 1, wherein the two temples are elastic.

* * * * *